US010467835B2

(12) United States Patent
Jones et al.

(10) Patent No.: US 10,467,835 B2
(45) Date of Patent: Nov. 5, 2019

(54) METHOD AND APPARATUS FOR ACCESS CONTROL

(71) Applicant: Walmart Apollo, LLC, Bentonville, AR (US)

(72) Inventors: Nicholaus A. Jones, Fayetteville, AR (US); Matthew A. Jones, Bentonville, AR (US); Robert J. Taylor, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 460 days.

(21) Appl. No.: 15/072,002

(22) Filed: Mar. 16, 2016

(65) Prior Publication Data

US 2016/0335821 A1 Nov. 17, 2016

Related U.S. Application Data

(60) Provisional application No. 62/161,576, filed on May 14, 2015.

(51) Int. Cl.
*G07C 9/00* (2006.01)
*G06Q 10/08* (2012.01)

(52) U.S. Cl.
CPC ....... *G07C 9/00896* (2013.01); *G06Q 10/083* (2013.01); *G06Q 10/087* (2013.01); *G07C 9/0069* (2013.01); *G07C 9/00142* (2013.01); *G07C 9/00166* (2013.01); *G07C 9/00571* (2013.01)

(58) Field of Classification Search
None
See application file for complete search history.

(56) References Cited

U.S. PATENT DOCUMENTS

| 3,881,171 A | * | 4/1975 | Moorman | G07C 9/00674 340/5.28 |
| 5,774,053 A | * | 6/1998 | Porter | A47G 29/141 232/19 |
| 6,344,796 B1 | | 2/2002 | Ogilvie | |
| 6,769,611 B2 | | 8/2004 | Miller | |
| 7,268,666 B2 | | 9/2007 | Fassbender | |
| 8,957,970 B1 | * | 2/2015 | Young | B65G 1/137 348/161 |
| 2007/0192200 A1 | | 8/2007 | Weng | |
| 2007/0247276 A1 | * | 10/2007 | Murchison | G07C 9/00087 340/5.2 |
| 2009/0179735 A1 | | 7/2009 | VanRysselberghe | |
| 2012/0185363 A1 | | 7/2012 | Gilbert | |

FOREIGN PATENT DOCUMENTS

EP 1986939 11/2008
WO 99044161 9/1999

* cited by examiner

Primary Examiner — Garcia Ade
(74) Attorney, Agent, or Firm — Fitch, Even, Tabin & Flannery, LLP

(57) ABSTRACT

An access control apparatus includes a selectively-lockable access portal for a facility, an order number entry terminal, and a control circuit operably coupled to the foregoing components and configured to control a lock state of the selectively-lockable access portal as a function of an order number entered via the order number entry terminal. By one approach the order number entry terminal includes a keypad and is disposed proximal to a corresponding selectively-lockable access portal. By one approach the aforementioned order number comprises an advanced shipping notice (ASN) number.

19 Claims, 3 Drawing Sheets

METHOD AND APPARATUS FOR ACCESS CONTROL

RELATED APPLICATION(S)

This application claims the benefit of U.S. Provisional application No. 62/161,576, filed May 14, 2015, which is incorporated by reference in its entirety herein.

TECHNICAL FIELD

These teachings relate generally to controlling access to a facility.

BACKGROUND

Many facilities receive deliveries from a variety of sources and delivery services on a regular basis. Such facilities include a variety of shopping facilities (including large so-called box stores), distribution centers, and so forth. In some cases such deliveries may be received at any time over the better portion of the day (including, in some cases, 24 hour availability in these regards). The deliveries themselves can include, for example, bulk and/or individually-ordered items that are intended for further distribution and/or sale.

In many cases it is desirable or even critical that completion of each delivery include receiving the delivered item(s) inside the receiving facility. In many cases, however, the receiving facility controls access to the interior of the facility as part of an observed security protocol. Assigning (part time or full time) a facility associate to be available to effectuate or monitor such access can represent considerable cost and often an inefficient use of that associate's time.

To accommodate the aforementioned needs while avoiding an inefficient use of an associate's time, some prior art approaches provide for the delivery person to effectuate their own entry to the facility in order to complete their delivery. As one example in these regards, the facility may vet and authorize a particular delivery person or service (prior to any scheduled delivery) and assign that person/service a corresponding indication of that authorization (i.e., an indication, such as a personal identification number (PIN), that corresponds to the person or the service) that can be used in future visits to gain entry to the facility. Though useful, such an approach does not necessarily meet the needs of all application settings. For example, administering such an approach can task security personnel with additional burdens that of course represent additional effort and overhead costs.

BRIEF DESCRIPTION OF THE DRAWINGS

The above needs are at least partially met through provision of the method and apparatus for access control described in the following detailed description, particularly when studied in conjunction with the drawings, wherein.

Figure 1:
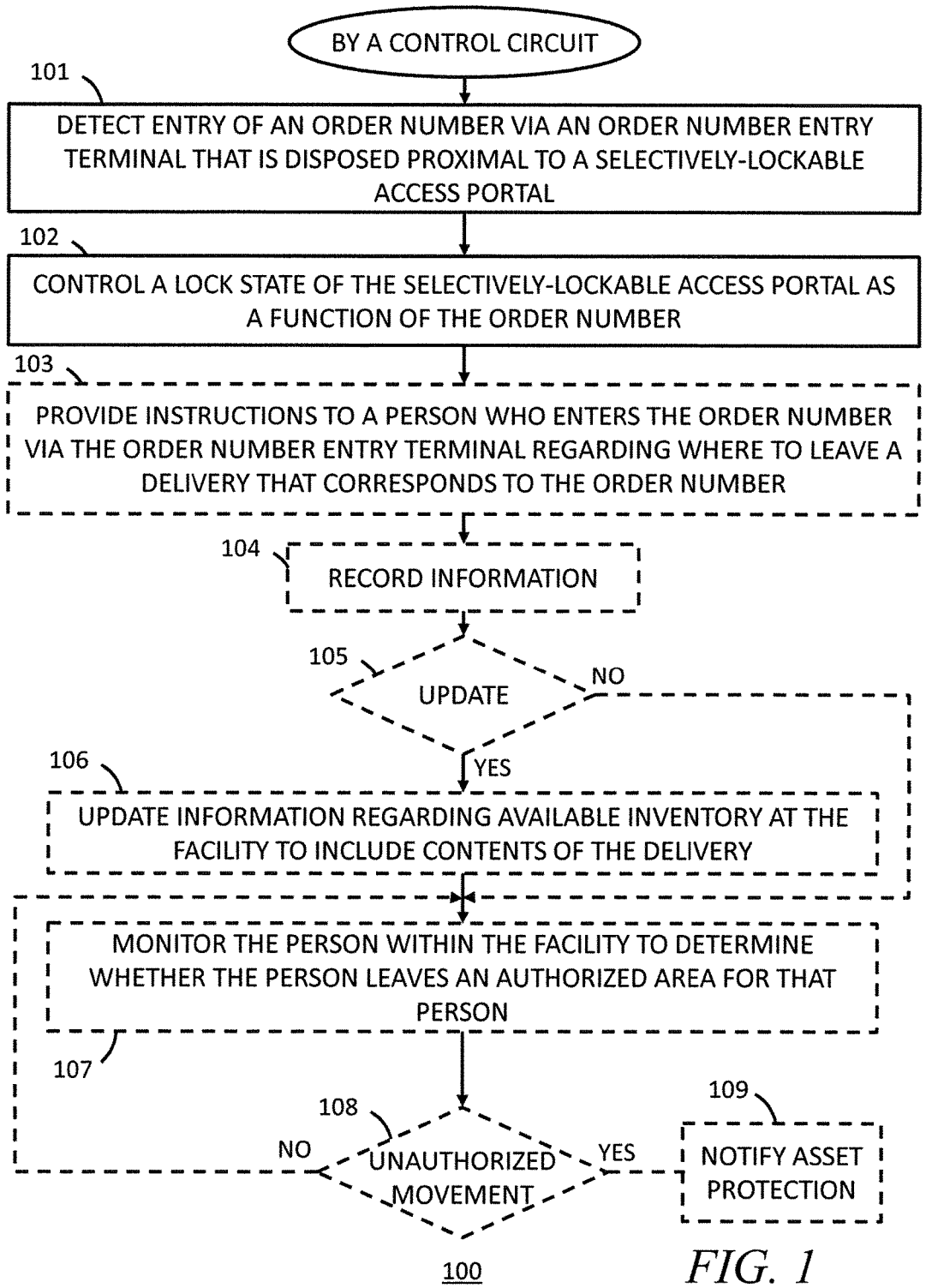
FIG. 1 comprises a flow diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, an access control apparatus includes a selectively-lockable access portal for a facility, an order number entry terminal, and a control circuit operably coupled to the foregoing components and configured to control a lock state of the selectively-lockable access portal as a function of an order number entered via the order number entry terminal. By one approach the order number entry terminal includes a keypad and is disposed proximal to a corresponding selectively-lockable access portal. By one approach the aforementioned order number comprises an advanced shipping notice (ASN) number.

So configured, these teachings leverage a unique identifier that already corresponds to an expected delivery (i.e., an order number such as the aforementioned ASN number) to serve as well to facilitate an automated entry procedure for a delivery service.

These teachings are highly flexible in practice and will accommodate a variety of modifications. By one example, the control circuit further serves to provide instructions to a person who enters the order number regarding where to leave a delivery that corresponds to the entered order number. For example, when the facility includes a plurality of delivery-receiving areas, those instructions can identify a particular one of the plurality of delivery-receiving areas as the location where the delivery service should leave the present delivery.

As another example, the control circuit can be further configured to determine whether to update information regarding available inventory at the facility to include contents of the delivery. This determination can be made, at least in part, as a function of where the delivery was left.

As yet another example in these regards, the control circuit can be further configured to monitor the delivery person within the facility after unlocking the selectively-lockable access portal for the facility. The control circuit can utilize, for example, at least one of video information and information from one or more proximity sensors to carry out such monitoring.

Figure 2:
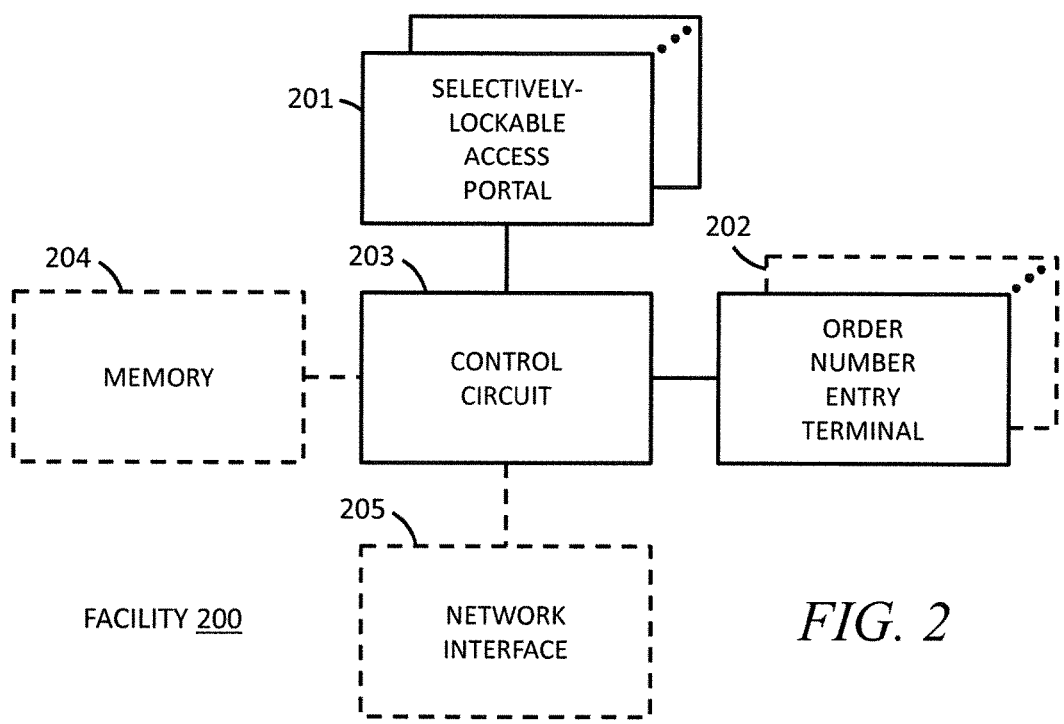
FIG. 2 comprises a block diagram as configured in accordance with various embodiments of these teachings.

These and other benefits may become clearer upon making a thorough review and study of the following detailed description. Referring now to the drawings, and in particular to FIG. 1, an illustrative process 100 that is compatible with many of these teachings will now be presented. This process 100 will be presented herein as being carried out by an access control apparatus illustrated in FIG. 2. It will be understood, however, that the details of this description are intended to serve an illustrative purpose and are not intended to suggest any particular corresponding limitations.

Figure 3:
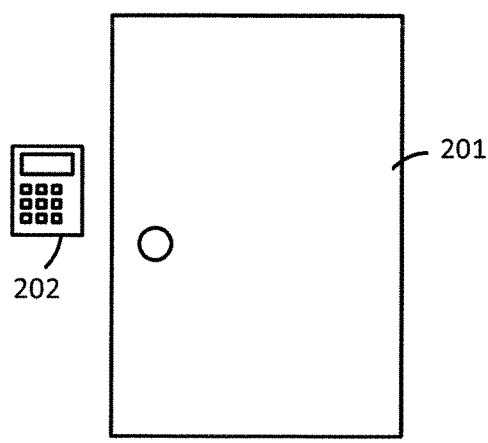
FIG. 3 comprises a front elevational view as configured in accordance with various embodiments of these teachings.

In this illustrative example the access control apparatus includes components of a corresponding facility 200 such as a building (or buildings) comprising a shopping facility. These components include at least one selectively-lockable access portal 201 and at least one order number entry terminal 202. Referring momentarily to FIG. 3, by one approach this selectively-lockable access portal 201 comprises a door. Being "selectively lockable," the locked or unlocked state of the door is automatically controllable via one or more electronically-controlled locks. Electronically-control blocks of various kinds are well known in the art. Since the present teachings are not overly sensitive to selection of any particular electronically-control lock, further elaboration in these regards is not provided here. These teachings will also accommodate doors that can be automatically opened and/or closed by a control circuit in addition to be locked and/or unlocked.

Figure 4:
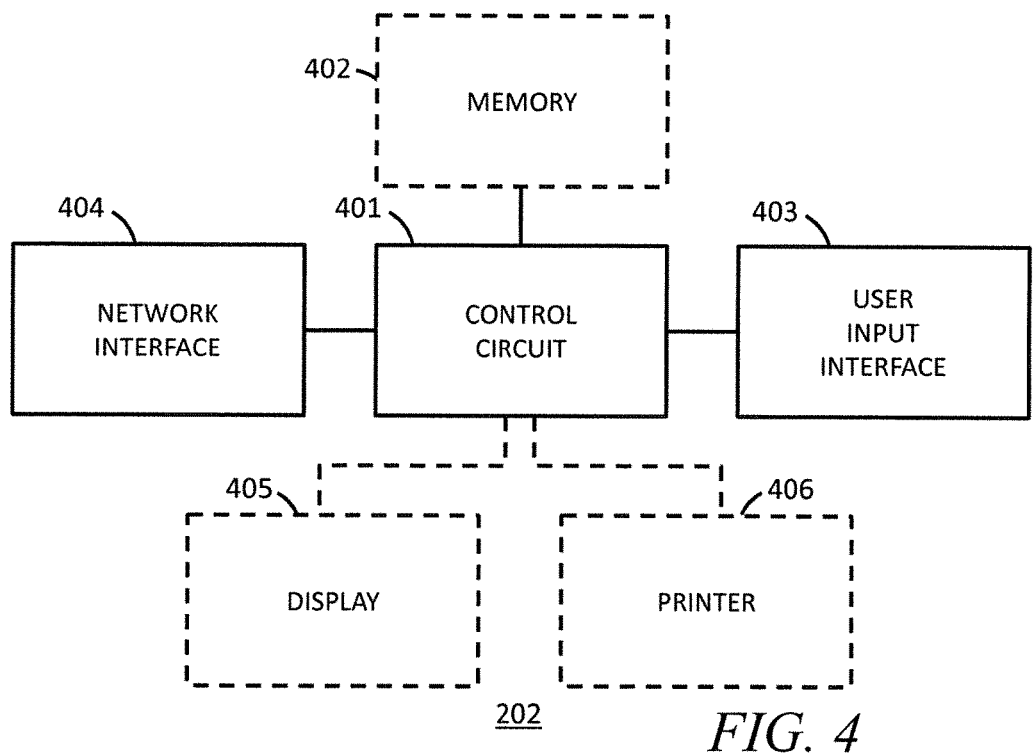
FIG. 4 comprises a block diagram as configured in accordance with various embodiments of these teachings.

Referring momentarily to FIG. 4, the aforementioned order number entry terminal 202 includes a control circuit 401. Such a control circuit 401 can comprise a fixed-purpose hard-wired platform or can comprise a partially or wholly programmable platform. These architectural options are well known and understood in the art and require no further description here. This control circuit 401 is configured (for example, by using corresponding programming as will be well understood by those skilled in the art) to carry out one or more of the steps, actions, and/or functions described herein.

By one optional approach the control circuit 401 operably couples to a memory 402. The memory 402 may be integral to the control circuit 401 or can be physically discrete (in whole or in part) from the control circuit 401 as desired. This memory 402 can also be local with respect to the control circuit 401 (where, for example, both share a common circuit board, chassis, power supply, and/or housing) or can be partially or wholly remote with respect to the control circuit 401 (where, for example, the memory 402 is physically located in another facility, metropolitan area, or even country as compared to the control circuit 402).

This memory 402 can serve, for example, to non-transitorily store the computer instructions that, when executed by the control circuit 401, cause the control circuit 401 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory such as read-only memory (ROM) as well as volatile memory such as an erasable programmable read-only memory (EPROM).)

In this illustrative example the control circuit 401 also operably couples to a user input interface 403. This user input interface 403 can comprise any of a variety of user-input mechanisms such as, but not limited to, keyboards and keypads (including out for numeric, alphabetic-only, and numeric-only versions thereof), cursor-control devices, touch-sensitive displays, speech-recognition interfaces, gesture-recognition interfaces, and so forth to facilitate receiving information from a user.

In this illustrative example the control circuit 401 also operably couples to a network interface 404. This network interface 404 can comprise a wireless and/or a non-wireless interface as desired. Network interfaces of various kinds are well known in the art and require no further description here.

These teachings will also accommodate a variety of other components and peripherals as desired. As two illustrative examples in these regards, the order number entry terminal 202 can include a display 405 and/or a hardcopy printer 406. So configured, the control circuit 401 can employ the display 405 to present a variety of textual, numeric, and/or graphic information to a user and can employ the printer 406 to print, for example, a hard copy receipt for a delivery person.

So configured, and as described herein, a delivery person can use the order input entry terminal 202 to enter an order number corresponding to one or more of their present deliveries for this facility 200. By one approach, and as presented in FIG. 3, an order number entry terminal 202 can be disposed proximal to a corresponding selectively-lockable access portal 201 on an external wall of the facility 200. Accordingly, the order number entry terminal 202 can be located within, say, 1 feet, 2 feet, or 3 feet of the corresponding selectively-lockable access portal 201. These teachings will accommodate other further distances if desired to meet the needs and/or opportunities presented by a given application setting.

Referring again to FIG. 2, the access control apparatus can further include a control circuit 203 that operably couples to the aforementioned selectively-lockable access portal(s) 201 and the order number entry terminal(s) 202. As with the order number entry terminal control circuit 401 described above, the access control apparatus control circuit 203 can comprise a fixed-purpose hard-wired platform or can comprise a partially or wholly programmable platform. This control circuit 203 can again be configured (for example, by using corresponding programming as will be well understood by those skilled in the art) to carry out one or more of the steps, actions, and/or functions described herein.

And, also as with the order number entry terminal control circuit 401 described above, the access control apparatus control circuit 203 can operably couple to an optional memory 204. The description provided above for the order number entry terminal memory 402 is applicable here as well and will not be repeated for the sake of brevity.

In this illustrative example the access control apparatus control circuit 203 can also operably couple to an optional network interface 205. This network interface 205 can permit the control circuit 203 to communicate with other such control circuits, with order number entry terminal control circuits 401, and/or with other information sources, servers, or the like as desired.

Referring to all of the above-described illustrations, including the process 100 shown in FIG. 1, the access control apparatus control circuit 203 detects, at block 101, entry of an order number via the above-described order number entry terminal 202 that is disposed proximal to a selectively-lockable access portal 201. This detection can comprise receiving the order number as entered by a delivery person using, for example, a keypad that comprises the above-described user input interface 403. As another example, this detection can comprise scanning an optical code, such as a barcode, that includes the order number.

The entered order number, by one approach, comprises an advanced shipping notice (ASN) number (also sometimes known in the art as an advanced ship notice number). ASN's are specified pursuant to a global standard and constitute a notification of pending deliveries, similar to a packing list. In the electronic data interface (EDI) X12 system it is known as the EDI 856 document and the EDIFACT equivalent is the DESADV (Dispatch Advice) message. (By another approach, the entered order number could be an enterprise receiving order number; i.e., a number that the enterprise itself generates and provides in regards to the order pursuant to a number generation protocol that is other than ASN compliant.)

The ASN can be used to list the contents of a shipment of goods as well as additional information relating to the shipment, such as order information, product description, physical characteristics, type of packaging, markings, carrier information, and configuration of goods within the transportation equipment. The ASN enables the sender to describe the contents and configuration of a shipment in various levels of detail and provides an ordered flexibility to convey information. Although an ASN provides information similar to a bill of lading, its function is very different. While the bill of lading is meant to accompany a load on its path, the goal of the ASN is to provide information to the destination's receiving operations well in advance of delivery. This tends to impact the logistics stream in three areas: cost, accuracy, and flexibility.

In addition to whatever other information the ASN might include, an ASN will also include a unique ASN number that is particularly associated with its corresponding ASN. Accordingly, it is extremely unlikely that a given recipient will ever see the same ASN number twice as deliveries are received over time. These teachings leverage that uniqueness by contemplating use of that ASN number, which is typically known to both the delivery service and the recipient in the ordinary course of ASN practice, as a basis for automatically providing the delivery service with access to the facility to complete a given delivery.

Accordingly, by one approach, the delivery service person enters an ASN number as corresponds to their present delivery into the order number entry terminal 202 and the access control apparatus control circuit 203 detects entry of that ASN number. At block 102 this control circuit 203 controls a lock state of the corresponding selectively-lockable access portal 201 as a function of that order number (in this example, the entered ASN number). By one approach, the control circuit 203 compares the entered order number against a list of expected order numbers to confirm that the entered order number is in fact expected. (By one approach these teachings will accommodate determining not only that the order number is expected, but that the order number is entered within a predetermined authorized window of time during which, and only during which, the corresponding delivery is expected or permitted.)

When an expected order number is appropriately entered by a delivery service person, per the foregoing the access control apparatus control circuit 203 automatically unlocks the corresponding selectively-lockable access portal 201 to thereby permit the delivery service person to gain access to the facility 200 and thereby complete their delivery. When the number entered as per the foregoing description does not match an expected order number, the access control apparatus control circuit 203 can instead control the lock state of the selectively-lockable access portal 202 by maintaining the locked status of that portal 202. These teachings will also accommodate automatically notifying the asset protection function for the facility when the number entered does not match the expected order number.

Figure 5:
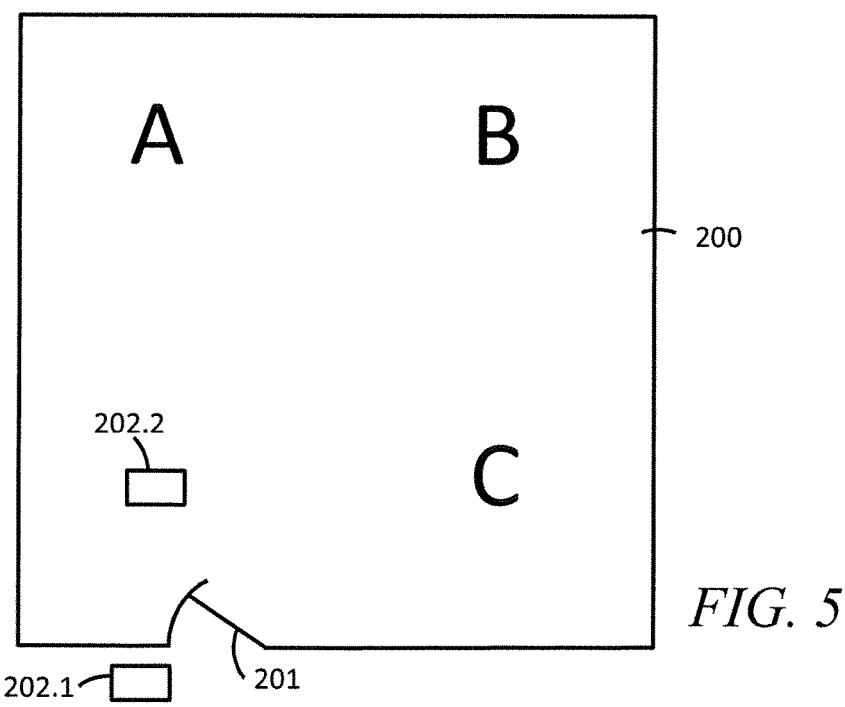
FIG. 5 comprises a top plan schematic view as configured in accordance with various embodiments of these teachings.

In addition to controlling access to a facility as described above in a highly efficient and secure manner, this process 100 will readily accommodate a variety of other optional activities. By one approach, for example, at optional block 103 the control circuit 203 provides instructions to a person who enters their order number regarding where to leave a delivery that corresponds to that order number. As a simple illustrative example in these regards, FIG. 5 illustrates a facility 200 having three general receiving areas within the facility 200 that are denoted by the letters A, B, and C. In this case, the control circuit 203 can provide instructions to the delivery person that this particular delivery should be placed in one of these specific areas. So configured, such a control circuit 203 can greatly facilitate subsequent handling and processing of the delivery by facility associates.

Referring again to FIG. 1, at optional block 104 the control circuit 203 can record information of choice upon having, for example, permitted the delivery service person to enter the facility 200 to effect a delivery. Useful information might comprise, for example, the aforementioned order number and the time at which the order number was entered via the order number entry terminal 202. Such information can be recorded locally and/or transferred to a remote storage facility as desired. By one approach this information can provide the basis for auditing or other studies.

In some cases the items being delivered serve to replenish or otherwise supplement available inventory at the recipient shopping facility. With that in mind, at block 105 the control circuit 203 can determine whether to update information regarding available inventory at the facility 200 to include contents of the delivery. By one approach this determination can be based, at least in part, upon where the delivery was left. As noted above, these teachings will accommodate instructing the delivery service person to place the delivered item(s) at a specific location within the facility 200. In some facilities one location within the facility may serve to contain items comprising a confirmed part of the facility's inventory while other locations may contain items that require, for example, further inspection or other processing before becoming a part of the facility's inventory. In such a case, when the delivered items have been placed in an area that contains only items that are "in inventory," at block 106 the control circuit 203 can automatically update information regarding available inventory at the facility 200 to include contents of that delivery.

At optional block 107, by one approach the control circuit 203 can monitor the delivery service person within the facility 200 to determine whether that person leaves an authorized area for that person. By one approach the control circuit 203 can be configured to monitor the person within the facility 200 using video information provided by one or more video cameras at the facility 200. By another approach, in lieu of the foregoing or in combination therewith, the control circuit 203 can be configured to monitor the person within the facility 200 using information from one or more proximity sensors (such as, for example, proximity sensors located at various doorways leading from the authorized area). Upon detecting (at block 108) unauthorized movement of the person, these teachings can provide, for example, for notifying (at block 109) one or more persons responsible for asset protection at the facility 200.

Those skilled in the art will recognize that a wide variety of modifications, alterations, and combinations can be made with respect to the above described embodiments without departing from the scope of the invention. As one example in these regards, these teachings will accommodate permitting the delivery service person to enter a plurality of order numbers at the order number entry terminal 202. This capability can include, if desired, then providing the delivery service person with instructions regarding specific locations inside the facility 200 where each corresponding delivery should be placed. Such instructions could be included, for example, on a printed receipt that the order number entry terminal 202 provides to the delivery service person.

As another example in these regards, and referring to FIG. 5, a given facility 200 might have two order number entry terminals (denoted here as 202.1 and 202.2), one located outside the facility 200 and one located inside the facility 200. In the case where a delivery service person has more than one "delivery" to deliver to this facility 200 (and therefore has, for example, more than one ASN and more than one ASN number), the delivery service person can enter a first order number at the exterior order number entry terminal 202.1 to gain access through the corresponding selectively-lockable access portal 201 for the facility 200. The delivery service person can then place the order corresponding to that first order number at the location within the facility 200 as instructed by the control circuit 203.

To avoid having to exit the facility 200 and then reenter upon entering a second order number as corresponds to the second delivery, the delivery service person can instead enter the second order number at the order number entry terminal 202.2 that is disposed within the facility 200. The control circuit 203, upon receiving and authenticating that second order number, could then provide instructions to the delivery service person regarding a particular location within the facility 200 where the second delivery items should be placed which of course may be different than the location where the items for the first delivery were placed.

As another example in these regards, by one approach the control circuit 203 can cause the order number entry terminal 202 to print a receipt for the delivery service person as a hardcopy record of having made the delivery.

It will therefore be understood that such modifications, alterations, and combinations are to be viewed as being within the ambit of the inventive concept.

What is claimed is:

1. An access control apparatus, comprising:
   a selectively-lockable access portal for a facility;
   an order number entry terminal;
   a control circuit operably coupled to the selectively-lockable access portal and to the order number entry terminal and configured to control a lock state of the selectively-lockable access portal as a function of an order number entered via the order number entry terminal, wherein the order number comprises an advanced shipping notice (ASN) number.

2. The access control apparatus of claim 1 wherein the selectively-lockable access portal comprises a door.

3. The access control apparatus of claim 1 wherein the order number entry terminal comprises a keypad.

4. The access control apparatus of claim 1 wherein the order number entry terminal is disposed proximal to the selectively-lockable access portal and external to the facility.

5. The access control apparatus of claim 1 wherein the control circuit is further configured to:
   provide instructions to a person who enters the order number via the order number entry terminal regarding where to leave a delivery that corresponds to the order number.

6. The access control apparatus of claim 5 wherein the facility includes a plurality of delivery-receiving areas, and wherein the instructions regarding where to leave a delivery include information identifying a particular one of the plurality of delivery-receiving areas.

7. The access control apparatus of claim 5 further comprising:
   a second order number entry terminal that is disposed within the facility;
   and wherein the control circuit is further configured to:
   provide instructions to a person who enters another order number via the second order number entry terminal regarding where to leave a delivery that corresponds to the another order number.

8. The access control apparatus of claim 5 wherein the control circuit is further configured to:
   determine whether to update information regarding available inventory at the facility to include contents of the delivery.

9. The access control apparatus of claim 8 wherein the control circuit determines whether to update information regarding available inventory at the facility to include contents of the delivery as a function, at least in part, of where the delivery was left.

10. The access control apparatus of claim 5 wherein the control circuit is further configured to:
    monitor the person within the facility to determine whether the person leaves an authorized area for that person.

11. The access control apparatus of claim 10 wherein the control circuit is configured to monitor the person within the facility using at least one of:
    video information; and
    information from at least one proximity sensor.

12. The access control apparatus of claim 1 wherein the control circuit is further configured to control the lock state of the selectively-lockable access portal as a function of whether the order number is entered via the order number entry terminal within a predetermined authorized window of time.

13. The access control apparatus of claim 1 wherein the control circuit is configured to control the lock state of the selectively-lockable access portal, at least in part, by automatically moving a portal barrier that comprises a part of the selectively-lockable access portal.

14. The access control apparatus of claim 1 wherein the control circuit is further configured to:
    record the order number and a time at which the order number was entered via the order number entry terminal.

15. The access control apparatus of claim 14 wherein the control circuit is further configured to record image information corresponding to at least one of:
    entry of the order number via the order number entry terminal; and
    a delivery that corresponds to the order number.

16. A method for use with a selectively-lockable access portal for a facility, comprising:
    by a control circuit:
    detecting entry of an order number via an order number entry terminal that is disposed proximal to the selectively-lockable access portal;
    controlling a lock state of the selectively-lockable access portal as a function of the order number, wherein the order number comprises an advanced shipping notice (ASN) number.

17. The method of claim 16 further comprising:
    providing instructions to a person who enters the order number via the order number entry terminal regarding where to leave a delivery that corresponds to the order number.

18. The method of claim 17 wherein the facility includes a plurality of delivery-receiving areas, and wherein the instructions regarding where to leave a delivery include information identifying a particular one of the plurality of delivery-receiving areas.

19. The method of claim 18 further comprising: determining whether to update information regarding available inventory at the facility to include contents of the delivery.

\* \* \* \* \*